July 31, 1951 W. W. MUMFORD 2,562,281

DIRECTIVE PICK-UP FOR TRANSMISSION LINES

Filed June 14, 1944 6 Sheets-Sheet 1

INVENTOR
W. W. MUMFORD
BY
B. F. Stoddard
ATTORNEY

INVENTOR
W. W. MUMFORD
BY
B. F. Stoddard
ATTORNEY

DIRECTIVE PICK-UP FOR TRANSMISSION LINES

Filed June 14, 1944 6 Sheets-Sheet 3

INVENTOR
W. W. MUMFORD
BY
B. R. Stoddard
ATTORNEY

DIRECTIVE PICK-UP FOR TRANSMISSION LINES

Filed June 14, 1944 6 Sheets-Sheet 4

INVENTOR
W. W. MUMFORD
BY
Stoddard
ATTORNEY

July 31, 1951 W. W. MUMFORD 2,562,281

DIRECTIVE PICK-UP FOR TRANSMISSION LINES

Filed June 14, 1944 6 Sheets-Sheet 5

INVENTOR
W. W. MUMFORD
BY
B. F. Stoddard
ATTORNEY

July 31, 1951 W. W. MUMFORD 2,562,281

DIRECTIVE PICK-UP FOR TRANSMISSION LINES

Filed June 14, 1944 6 Sheets-Sheet 6

INVENTOR
W. W. MUMFORD
BY: B. R. Stoddard
ATTORNEY

Patented July 31, 1951 2,562,281

UNITED STATES PATENT OFFICE 2,562,281

DIRECTIVE PICKUP FOR TRANSMISSION LINES

William W. Mumford, Shrewsbury Township, Monmouth County, N. J., assignor to Bell Telephone Laboratories, Incorporated, New York, N. Y., a corporation of New York Application June 14, 1944, Serial No. 540,252

12 Claims. (Cl. 171—95)

This invention relates to transmission lines and, more particularly, to a directive pick-up device adapted to be coupled to a transmission line for separately deriving either simultaneously or alternatively two different currents. One of these derived currents is a function of current flowing in one direction over the transmission line and the other derived current is a function of current flowing in the opposite direction over the line.

When a wave generator is connected by a transmission line to a terminal load circuit, it is desirable to match the terminal load impedance to the impedance of the transmission line. Otherwise a mismatch of the terminal impedance causes a portion of the direct waves transmitted over the line from the generator to be reflected back over the line from the point of mismatch. Standing waves are thus set up between that point of mismatch and the generator thereby causing a loss in the amount of useful energy delivered to the load.

In matching a terminal load impedance to the characteristic impedance of a transmission line, it is usually necessary to determine the value of the load impedance which will properly terminate the transmission line without introducing reflection at the terminal. There are no reflected waves when the terminal load impedance matches the impedance of the line. The standing wave condition in the line is a function of the terminal load impedance. In other words, the terminal impedance and the standing wave ratio, which is the ratio of the maximum line voltage to the minimum line voltage, are mutually dependent variables so that, if one is known, the other can be calculated. Therefore, the standing wave ratio is, in effect, a measure of the match between the impedance of the load and the impedance of the transmission line.

Accordingly, it is an object of this invention to provide an improved stationary detector, or directive pick-up device, for determining the measure of the impedance match between a transmission line and the load circuit to which it is coupled.

It is also an object of this invention to furnish improved means for determining either the average power or the peak power delivered by a transmission line to a load circuit.

A further object of the invention is to supply improved means for obtaining an indication, independently of standing waves in the line, of the instantaneous value of the power output delivered by a transmission line to a load circuit.

An additional object is to derive a current which is a function of current flowing in one direction over a transmission line and to derive separately, either simultaneously or alternatively, another current which is a function of current flowing in a different direction in the same transmission line.

A further object is to provide an improved fixed attenuation pad.

Still another object is to provide improved stationary means for detecting the magnitude of standing waves in a transmission line.

Another object is to provide improved means for deriving and supplying a relatively small calibrating power.

These and other objects of the invention are attained through the use of a stationary directive pick-up device adapted to be coupled to a transmission line. This pick-up device may comprise either a short coaxial line section or a short wave guide section affixed to the transmission line, which may also be either a coaxial line or a wave guide. The pick-up device is coupled to the transmission line by two coupling means spaced apart by a distance which is equal to one-quarter wavelength of the wave energy supplied to the transmission line. If desired, the coupling can be effected by a multiplicity of coupling means in order to increase the frequency band width of the desired response characteristics. In another modification of the invention, the pick-up device comprises a short two-wire transmission line loosely coupled to a two-wire transmission line by means of pick-up probes or loops. The pick-up device thus constitutes, in effect, a directive antenna which distinguishes between waves traveling in the two opposite directions along the transmission line. The pick-up device absorbs some of the energy of these waves and delivers samples of these waves to two separate output terminals. One of the derived currents is a function of the direct waves traveling along the transmission line and the other derived current is a function of the reflected waves.

In another embodiment of the invention, the output terminals of the directive pick-up device are coupled to two square law detecting devices connected in series opposition. The outputs of these square law detecting devices are connected to opposite sides of an indicating device, such as a direct current meter, which will then indicate the difference between the direct power in the line and the reflected power; that is, the meter will indicate the power absorbed by the load circuit.

In still another embodiment of the invention, the samples of the direct wave and the reflected wave are separately metered. From these meter readings, it is possible to calculate the amount of power incident upon the load circuit and also the amount of power reflected by the load. These values can then be used to determine both the average power output of the transmission line, which is the power absorbed by the load, and the standing wave ratio on the line.

These and other features of the invention are more fully described in connection with the following detailed description of the drawings in which.

Figure 1:
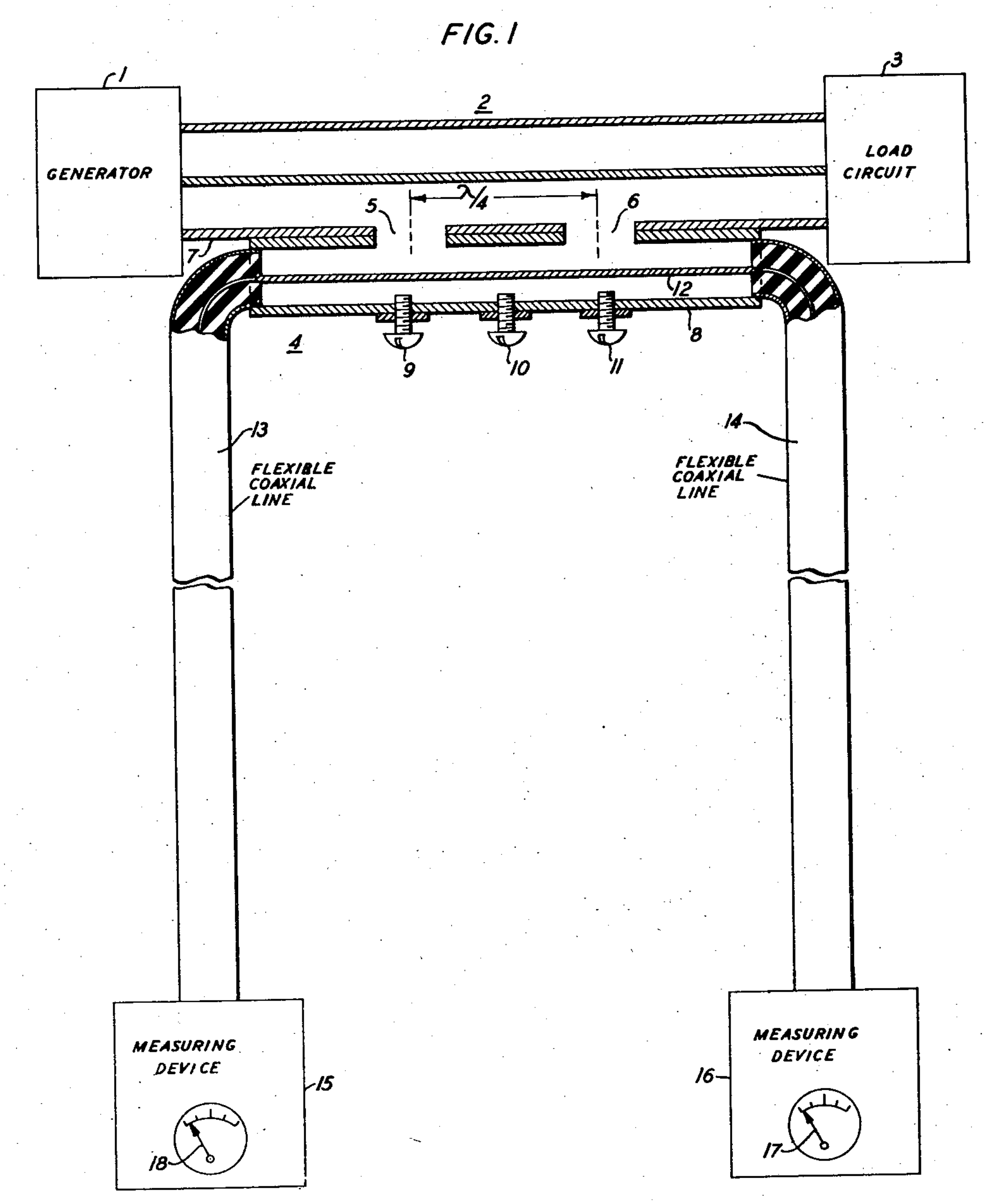
Fig. 1 is a schematic view of the directive pick-up device applied to a coaxial transmission line.

In Fig. 1, a wave generator 1 has its output connected by a coaxial transmission line 2 to a load circuit 3. A short coaxial line section 4 is affixed, such as by soldering, to the main coaxial transmission line 2 and is loosely coupled thereto by two apertures 5 and 6 cut through the outer coaxial conductors 7 and 8. These apertures 5 and 6 permit fixed fractional portions of wave energy to pass from line 2 to line 4. The apertures 5 and 6 are of equal size and the distance from the center of aperture 5 to the center of aperture 6 is equal to one-quarter of the wavelength of the wave produced by the generator 1. Three small bolts, or tuning screws, 9, 10, and 11 are inserted in three corresponding apertures in the outer coaxial conductor 8 of the short coaxial line section 4 as is indicated in Fig. 1. Unwanted reflected waves due to irregularities in the short line section 4 can be canceled by varying the capacitance of the line 4 by manually adjusting the degree of penetration of the tuning screws 9, 10, and 11 into the interspace between the coaxial conductors 8 and 12.

An attenuating coaxial line 13 is connected to one end of the short coaxial line section 4 and another attenuating coaxial line 14 is connected to the other end of the line section 4 for the purpose of providing impedance terminations to the line section 4. The coaxial lines 13 and 14 are of proper dimensions and lengths to provide the proper impedance for matching the characteristic, or surge, impedance at both ends of the coaxial line section 4. A measuring device 15 is connected to the attenuating coaxial line 13 and a second measuring device 16 is connected to the other attenuating coaxial line 14. These measuring devices 15 and 16 can be of any suitable type for measuring voltage, current, or power as is desired.

During periods of operation, the wave energy produced by the generator 1 travels along the coaxial transmission line 2 to the load circuit 3. A portion of this wave energy passes through the aperture 5 into the short coaxial line section 4 where it travels in opposite directions to both the left-hand end and the right-hand end of the line section 4. Another portion of the wave energy passes through the aperture 6 into the line section 4 and also travels in opposite directions to both ends of the line section 4. As the portions of wave energy which enter through the apertures 5 and 6 and which travel to the right-hand end of the line section 4 are equal in both phase and magnitude, they will combine additively and their sum will be delivered to the attenuating coaxial line 14 leading to the measuring device 16. The measuring device 16 will then operate its indicator 17 to indicate the value of the voltage, current or power of this combined wave energy. It is to be understood that the measuring device 16, as well as the measuring device 15, may be designed or calibrated to give its indication in terms of voltage, current or power according to whichever quality is desired to be investigated.

The portion of wave energy which enters line 4 through the aperture 6 and which travels to the left-hand end of the line 4 is equal in magnitude to the portion which enters through aperture 5 and which travels to the left-hand end of line 4. However, it is 180 degrees out of phase due to traveling one one-quarter wavelength from the center of aperture 5 to the center of aperture 6 in line 2 and another one one-quarter wavelength from the center of aperture 6 back to the center of aperture 5 in line 4. Therefore, these wave energies will cancel each other and will produce no effect in the measuring device 15.

If the impedance of the load circuit 3 does not match the impedance of the line 2, then some of the wave energy will be reflected back along line 2. Portions of this reflected energy will pass through the apertures 5 and 6 into line 4 and will travel in opposite directions to both ends of line 4. The portions traveling to the right-hand end of line 4 will be equal in magnitude but will be 180 degrees out of phase thereby canceling each other so that they will produce no effect in the measuring device 16. However, the portions traveling to the left-hand end of line 4 will be equal in both magnitude and phase so that they will combine additively and their sum will be delivered to the attenuating line 13 leading to the measuring device 15. The measuring device 15 will then operate its indicator 18 to indicate the value of the voltage, current or power of this combined reflected wave energy.

These two indications of the indicators 17 and 18 occur simultaneously and indicate the degree of mismatch between the impedance of the load circuit 3 and the line 2. The impedance of the load circuit 3 can then be adjusted in any desirable manner, such as by adjusting coaxial tuning stub lines. When a correct match is effected there will be no deflection of the indicator 18.

To determine the value of the power supplied to the load circuit 3 after the impedance of the load circuit 3 has been matched to the impedance of the line 2, the ratio of the power flowing in line 2 to the power supplied to the measuring device 16 is ascertained by substituting the measuring device 15 for the load circuit 3. This can be performed through the use of jacks and plugs. When the measuring device 15 is so connected, its indicator 18 will then indicate the value of the power delivered to the right-hand end of line 2. The ratio between the value now indicated by indicator 18 and the value indicated by indicator 17 is substantially invariant regardless of the power level supplied by the generator 1. Therefore, once the value of this power ratio is obtained, the value of the power subsequently supplied to the load circuit 3 by any other power level of the generator 1 can be determined simply by multiplying the power value then indicated by indicator 17 by this power ratio.

It is to be noted also that the right-hand end of the line 4 provides a relatively small power output the value of which bears a fixed ratio, dependent upon the dimensions of the apertures 5 and 6, to the value of the power supplied by the generator 1. This arrangement, therefore, constitutes a fixed attenuation pad. When the device is to be used in this capacity, the attenuating line 14 is disconnected and the right-hand end of line 4 is then connected to another load circuit where a small calibrating power or voltage is required. This calibrating power or voltage will remain substantially constant as long as the output of generator 1 remains constant.

Figure 2:
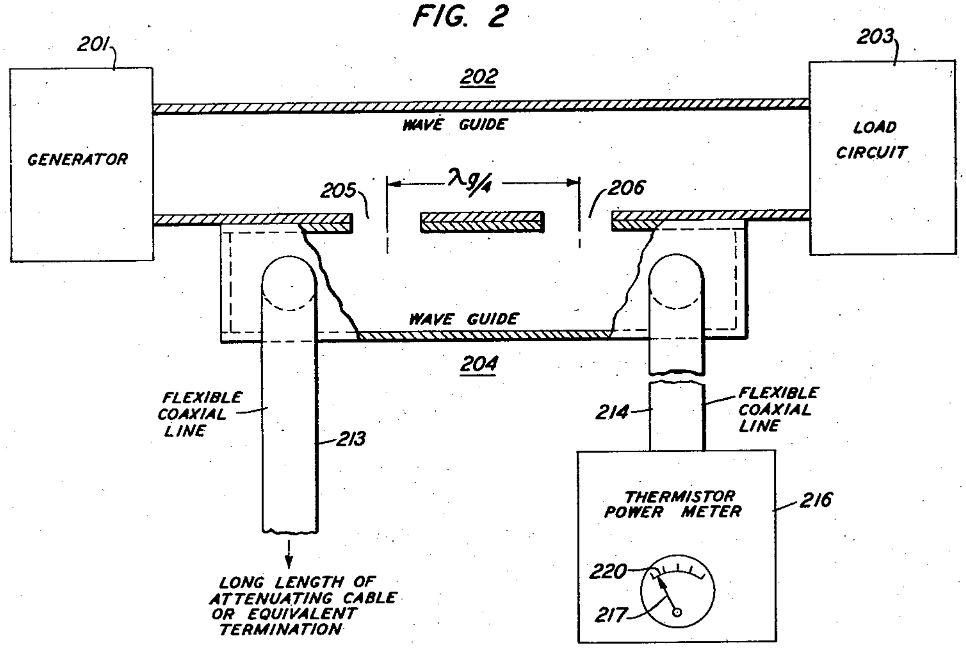
Fig. 2 is a schematic view of the directive pick-up device applied to a wave guide.

In Fig. 2, a wave generator 201 supplies its output energy over a wave guide 202 to a load circuit 203. A shorter wave guide 204 is affixed, such as by soldering, to the wave guide 202 and is loosely coupled thereto by means of two apertures 205 and 206 cut in the contiguous metallic envelopes of the wave guides 202 and 204 as is indicated in Fig. 2. The distance from the center of aperture 205 to the center of aperture 206 is equal to one-quarter of the wavelength of the wave propagated in the wave guide 202.

A flexible coaxial line 214 is coupled at one end by any appropriate means, such as a wave guide to coaxial transducer, to the right-hand end of the wave guide 204. The opposite end of the line 214 is coupled to a measuring device such as a thermistor power meter, having an indicator 217. An attenuating flexible coaxial line 213 is coupled at one end by any suitable means, such as a wave guide to coaxial transducer, to the left-hand end of the wave guide 204. The attenuating coaxial line 213 is such as to match the impedance of the left-hand end of the wave guide 204 and is sufficiently long to insure complete absorption of the received energy.

A portion of the wave energy propagated along the wave guide 202 passes through the aperture 205 into the wave guide 204 and another portion passes through the aperture 206 into the wave guide 204, each portion being propagated in opposite directions to each end of the wave guide 204. The portions from apertures 205 and 206 that are propagated to the left-hand end of wave guide 204 produce no effect as they are 180 degrees out of phase for the reason explained above in connection with the description of the operation of the device shown in Fig. 1. The portions propagated to the right-hand end of wave guide 204 are of equal magnitude and phase so that they combine additively and travel along the coaxial line 214 to the thermistor power meter 216. The thermistor power meter 216 then operates its indicator 217 to indicate the value, or measure, of the average incident, or direct, power delivered thereto.

Reflected wave energy does not affect this indication because any portions of such energy that pass through the apertures 205 and 206 at this time are 180 degrees out of phase when they arrive at the right-hand end of wave guide 204 for the reason described above in connection with Fig. 1. Also, any portions of such energy arriving at the left-hand end of wave guide 204 at this time produce no effect as they are completely absorbed in the attenuating coaxial line 213.

The power ratio between the power delivered to the right-hand end of wave guide 202 and the power delivered to the meter 216 can be determined in a manner similar to that described above for Fig. 1 by temporarily substituting the meter 216 for the load circuit 203 by any convenient means, such as jacks and plugs, and then observing the value indicated by the indicator 217. This value divided by the value delivered by line 214 is the power ratio which is substantially invariant for any reasonable, or practical, power level produced by the generator 201. When the meter 216 is again connected to the line 214, any value then indicated by its indicator 217 will, when multiplied by the power ratio, be a measure of the value of the average power delivered to the right-hand end of the wave guide 202. Since the power ratio is substantially invariant, the scale 220 of meter 216 can be so calibrated as to read directly in terms of the average power delivered to the right-hand end of wave guide 202.

The value of the average power of reflected wave energy produced by a mismatch between the impedance of the load circuit 203 and the impedance of wave guide 202 can be determined by interchanging the load circuit 203 and the generator 201 by any convenient means, such as clamps or flanges, so that the load circuit 203 will now be at the left-hand end of wave guide 202 and the generator 201 will be at the right-hand end of wave guide 201. The reflected wave energy will then be propagated in a direction from left to right in wave guide 202. Portions of this energy will pass through the apertures 205 and 206 to both ends of the wave guide 204. The portions arriving at the right-hand end of wave guide 204 are of equal magnitude and phase so that they combine additively and are delivered over line 214 to the meter 216. Meter 216 then operates its indicator 217 to indicate a value on scale 220 which, if the scale 220 has been calibrated as described above, will be the value of the average reflected power delivered to the right-hand end of wave guide 202.

By adjusting the impedance of the load circuit 203 in any suitable manner, as by adjusting tuning stubs or plugs, so as to effect a minimum reading on the scale 220, the impedance of the load circuit 203 can be matched to the impedance of the wave guide 202. If a perfect match is thus obtained, there will be no reflected wave.

Also, by thus ascertaining the value of the average power in the direct, or incident, wave and the value of the average power in the reflected wave, an estimate of the degree of mismatch may be readily obtained since the ratio of the indicated incident power and indicated reflected power is a measure of the amount by which the transmission line is misterminated by the load impedance. The degree of mismatch can be measured by calculating the standing wave ratio which is the ratio of the maximum voltage to the minimum voltage along the line. The standing wave ratio may be calculated by means of the expression:

$$SWR=\frac{1+\sqrt{\frac{P_R}{P_I}}}{1-\sqrt{\frac{P_R}{P_I}}}$$

where $P_I$ is the indicated value of the incident or direct power and $P_R$ is the indicated value of the reflected power.

Figure 3:
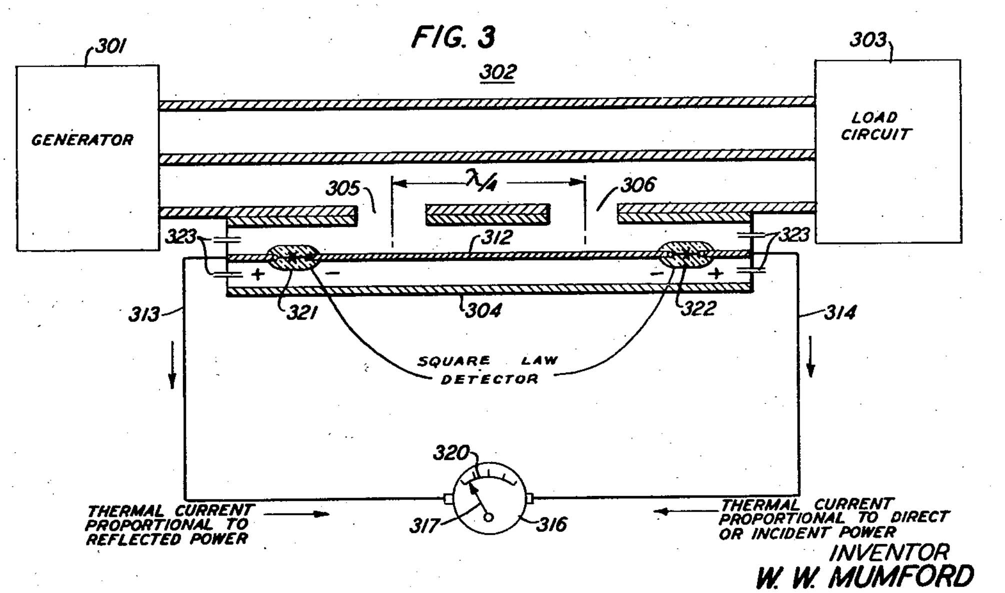
Fig. 3 is a view somewhat similar to Fig. 1 but showing in addition the use of square law detectors for supplying a direct current meter.

In Fig. 3, a wave generator 301 has its output energy supplied over a coaxial line 302 to a load circuit 303. A coaxial line section 304 is affixed, as by means of clamps, to line 302 and is loosely coupled thereto by apertures 305 and 306 which are of equal size. The distance from the center of aperture 305 to the center of aperture 306 is equal to one-quarter wavelength of the wave supplied by generator 301. Coupled to the central conductor 312 of the coaxial line section 304 near each end, as is indicated in Fig. 3, are two square law detecting devices 321 and 322. These may be of any suitable type, such as thermoelectric elements, crystals, or copper oxide rectifiers. The square law detectors 321 and 322 are connected in series opposition by conductors 313 and 314 to opposite terminals of a direct current meter 316, such as a microammeter or galvanometer, having an indicator 317 and a scale 320. A plurality of small capacitances 323 are connected into each end of the coaxial line section 304 for by-passing radio frequency energy.

As was explained above in connection with the description of the operation of the device shown in Fig. 1, the line section 304 will absorb through the apertures 305 and 306 some of the direct and reflected energy in line 302. Also as was described above, the portion of the absorbed energy delivered to the right-hand end of line section 304 is proportional to the direct, or incident, energy in line 302 and the portion delivered to the left-hand end of line 304 is proportional to the reflected energy in line 302. Therefore, the square law detector 322 will produce a direct current the strength of which is proportional to the value of the power in the direct, or incident, wave in line 302 and the square law detector 321 will produce a direct current the strength of which is proportional to the value of the power in the reflected wave in line 302. As these direct currents are supplied by the conductors 313 and 314 to the meter 316 in series opposition, the meter 316 will operate its indicator 317 in accordance with the value of the difference between these two direct currents. The scale 320 can be calibrated in terms of the power absorbed by the load circuit 303 by substituting a power measuring device in place of the load circuit 303. If the scale 320 is so calibrated, the indicator 317 will then, when operated by the meter 316, indicate the value of the power absorbed by the load circuit 303.

Figure 4:
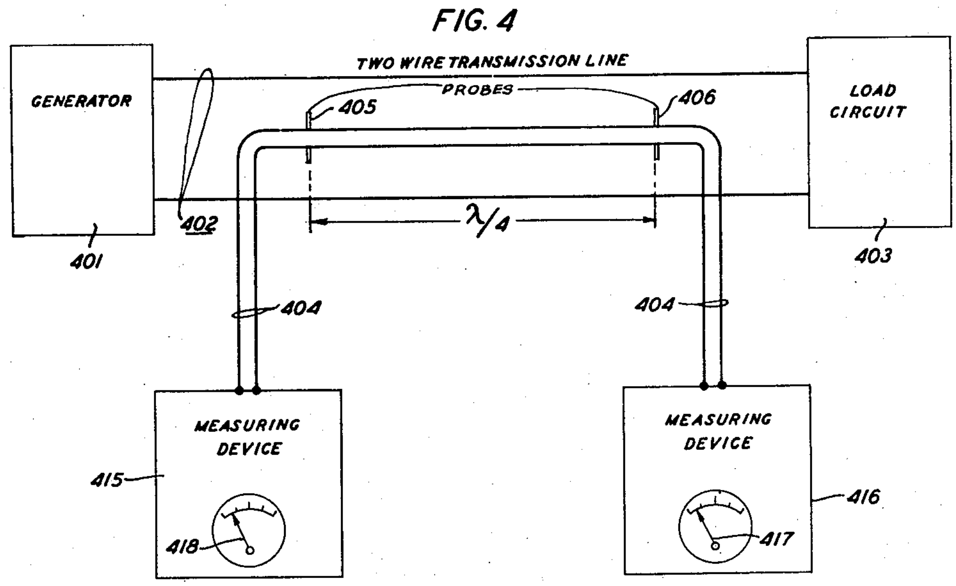
Fig. 4 illustrates the directive pick-up device applied to a two-wire transmission line.

In Fig. 4, a wave generator 401 has its output energy supplied over a two-wire transmission line 402 to a load circuit 403. Two measuring devices 415 and 416 are provided and they are similar to the corresponding measuring devices 15 and 16 of Fig. 1. The measuring devices 415 and 416 are coupled to the line 402 by a directive pick-up device comprising another two-wire line 404 having a portion thereof disposed equidistantly between the two conductors of the main line 402. The auxiliary line 404 is equipped with two pairs of transverse probes 405 and 406. The probes 405 and 406 each comprises two small metallic conductors each of which is secured perpendicularly to a different wire of the two-wire auxiliary line 404 and in a direction substantially parallel to the electric lines of force of the main line 402. The auxiliary line 404 is also so disposed that it will not pick up any energy from the main line 402 except through the probes 405 and 406. Probes 405 and 406 are so located that the distance between them is equal to one-quarter wavelength of the wave supplied by generator 401.

As is the case with the device of Fig. 1, the measuring device 416 is supplied with energy proportional to the energy flowing from left to right in the main line 402 and the measuring device 415 is supplied with energy proportional to the energy flowing from right to left in the main line 402. The measuring devices 415 and 416 operate their indicators 418 and 417 in accordance with the values of the powers supplied thereto. Thus, the measuring devices 415 and 416 function in the same manner and for the same purposes explained above in connection with the description of the operation of the device shown in Fig. 1.

Figure 5:
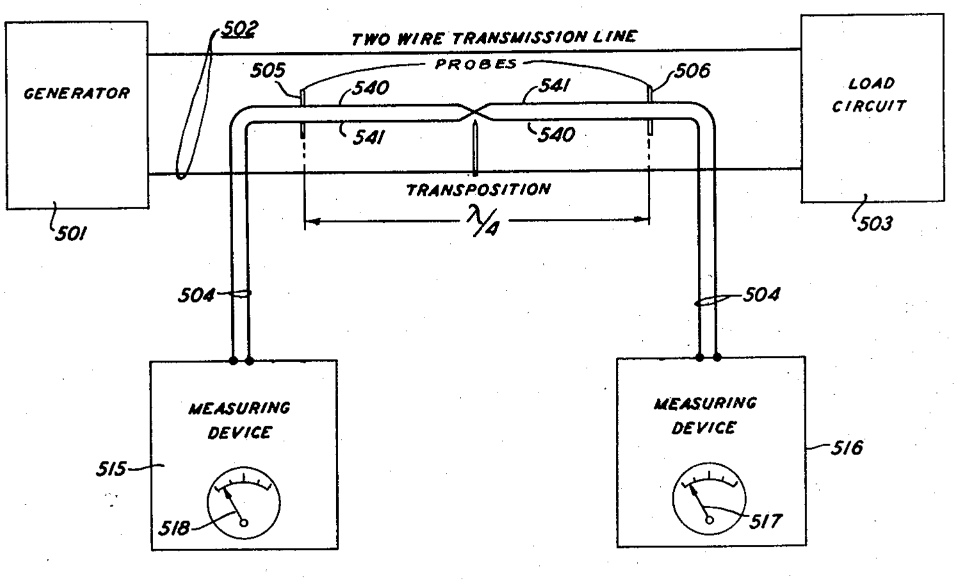
Fig. 5 is a modification of the directive pick-up employing transposition of the conductors of the auxiliary line.

In Fig. 5, a wave generator 501 has its output energy supplied over a two-wire transmission line 502 to a load circuit 503. Two measuring devices 515 and 516 are provided similarly to the corresponding measuring devices 415 and 416 of Fig. 4. The measuring devices 515 and 516 are coupled to the line 502 by a directive pick-up device comprising another two-wire line 504 having a portion thereof disposed equidistantly between the two conductors of the main line 502. The auxiliary line 504 is equipped with transverse probes 505 and 506. The probes 505 and 506 are constructed and disposed in the same manner as the probes 405 and 406 of Fig. 4. The auxiliary line 504 is disposed similarly to the line 404 in Fig. 4 except that the conductors 540 and 541 of the line 504 are transposed at a point between the probes 505 and 506 as is indicated in Fig. 5.

Due to this transposition of the conductors of line 504, the measuring device 516 is supplied with energy which is proportional to the energy flowing from right to left in the main line 502 and the measuring device 515 is supplied with energy proportional to the energy flowing from left to right in the main line 502. It is to be noted that this condition is the reverse of that existing in the device of Fig. 4. This is due to the fact that, when the upper element of the pair of probes 505 picks up energy from the wave traveling from left to right over the main line 502, this absorbed energy travels along conductor 540 from left to right. Likewise, the lower element of the pair of probes 506 will pick up energy from the wave traveling from left to right over the main line 502 and this absorbed energy will also travel from left to right along conductor 540. These two energies, although of equal magnitude, are of opposite polarity and will consequently cancel each other. This same condition exists in conductor 541.

At the same time, the upper element of the pair of probes 505 will pick up energy from the wave traveling from right to left over the main line 502 and this absorbed energy will travel from left to right along conductor 540. Likewise the lower element of the pair of probes 506 will pick up energy from the wave traveling from right to left over the main line 502 and this absorbed energy will travel from left to right along conductor 540. However, the energy picked up by probe 505 has traveled one one-quarter wavelength from right to left in line 502 more than that picked up by probe 506 and it then travels an additional one one-quarter wavelength from left to right in conductor 540. Thus, it travels a total of one-half wavelength more than the energy absorbed by probe 506 thereby producing a phase difference of 180 degrees. The energy from probe 505 is also of opposite polarity to that from probe 506. This difference in polarity is equivalent to an additional 180 degrees phase difference. These two phase differences each of 180 degrees produce a total phase difference of 360 degrees so that these two energies in conductor 540 will combine additively and will be supplied to the measuring device 516.

As the same condition exists in conductor 541, the measuring device 516 will be supplied with energy which is proportional to the energy flowing from right to left in the main line 502 and will operate its indicator 517 in accordance with this energy. For the same reasons, the measuring device 515 will be supplied with energy proportional to the energy flowing from left to right in the main line 502 and will operate its indicator 518 in accordance with this energy. The indications thus provided by the measuring devices 515 and 516 are used for the same purposes as the indications obtained from the arrangement of Fig. 1.

Figures 6, 7:
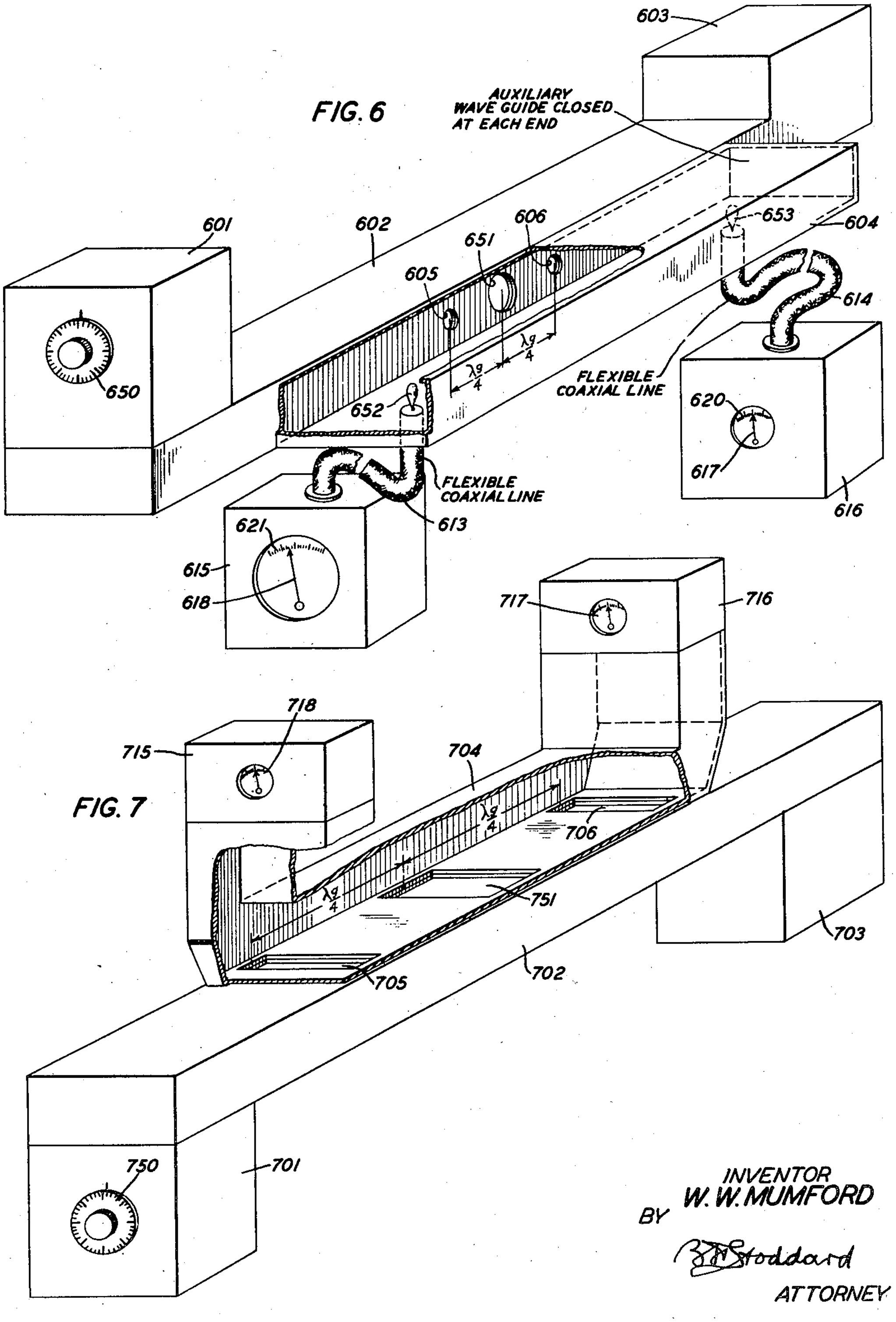
Fig. 6 is a perspective view of a modification of the directive pick-up device employing three coupling apertures.
Fig. 7 is a perspective view of another modification of the directive pick-up device employing three coupling apertures in the form of three transverse slots.

In Fig. 6, a wave generator 601 has its output conveyed by a wave guide 602 to a load circuit 603. The generator 601 is provided with a manually operable instrumentality, such as a manually rotatable knob 650 for varying the frequency of its wave energy. A second wave guide 604 of appropriate dimensions is mounted contiguously with one side of the wave guide 602. Both of these wave guides have metallic envelopes each of which is provided with three apertures 605, 651, 606 in their contiguous sides. The apertures in each envelope have the same size and shape as the corresponding apertures in the other envelopes and are aligned therewith. The spacing between the apertures is such that the distance from the center of aperture 605 to the center of aperture 651 is substantially equal to one-quarter wavelength of the wave energy produced by the generator 601 and the distance from the center of aperture 651 to the center of aperture 606 is also substantially equal to one-quarter wavelength of the wave energy produced by generator 601.

It is to be noted that the aperture 651 is larger than the apertures 605 and 606 which are of equal size and shape. Aperture 651 has a size and shape of such proportions and dimensions as to enable four times as much energy to pass from wave guide 602 into wave guide 604 as can pass through either aperture 605 or 606. Thus, the energy which enters wave guide 604 through aperture 651 has twice the electric field strength as that entering through either aperture 605 or 606. In other words, the magnitude of the electric field strength due to the energy entering through aperture 651 is equal to the combined magnitudes of the electric field strengths due to the energy entering through apertures 605 and 606.

The wave guide 604 is provided with two solid metallic probes 652 and 653 near each end as is shown in Fig. 6. Each probe is connected to one end of a different one of the flexible coaxial lines 613 and 614. Each of these lines has its other end connected to a different one of the measuring devices 615 and 616, as is also shown in Fig. 6, which are provided with indicators 617 and 618.

A portion of the wave energy flowing along wave guide 602 directly from generator 601 to the load circuit 603 passes through the aperture 605 into the wave guide 604. Part of this energy travels from left to right in wave guide 604 and is picked up by the probe 653. Another part of this energy travels from right to left in wave guide 604 and is picked up by the probe 652. Another portion of the wave energy flowing directly along the wave guide 602 from generator 601 to the load circuit 603 passes through aperture 651 into wave guide 604 and parts of this energy will flow in opposite directions in wave guide 604 and will be picked up by the probes 652 and 653. Still another portion of the above-mentioned energy in wave guide 602 will pass through aperture 606 and parts of this energy will flow in opposite directions along wave guide 604 and will also be picked up by the probes 652 and 653.

The current picked up by probe 652 from the wave energy entering through aperture 606 will be in phase with the current picked up by probe 652 from the wave energy entering through aperture 605 as the first-mentioned wave energy travels a distance which is a full wavelength longer. This distance is the one-quarter wavelength in wave guide 602 from aperture 605 to aperture 651, one-quarter wavelength in wave guide 602 from aperture 651 to aperture 606, one-quarter wavelength in wave guide 604 from aperture 606 to aperture 651, and one-quarter wavelength in wave guide 602 from aperture 651 to aperture 605. These two currents are of equal magnitude and, since they are in phase, combine additively.

The current picked up by probe 652 from the wave energy entering through aperture 651 will be 180 degrees out of phase with both of the above-mentioned currents because this wave energy travels one-half wavelength further than the wave energy from aperture 605 and one-half wavelength less than the wave energy from aperture 606. This distance of one-half wavelength is the one-quarter wavelength in wave guide 602 from aperture 605 to aperture 651 and another one-quarter wavelength in wave guide 604 from aperture 651 to aperture 605. Since the magnitude of the current from aperture 651 is twice that of either the current from aperture 605 or aperture 606, it is equal to their combined magnitudes. Therefore, as it is 180 degrees out of phase, these currents will cancel and will produce no effect at this time on the indicator 618 of the measuring device 615.

At the same time, the current picked up by probe 653 from the wave energy entering through aperture 605 will be in phase with the current picked up by probe 653 from the wave energy entering through aperture 606 because both of these wave energies will have traveled an equal distance. These two currents have equal magnitudes and, since they are in phase they will combine additively. The current picked up by probe 653 from the wave energy entering through aperture 651 is also in phase with the above-mentioned currents as this wave energy has traveled over a distance of the same length. These three currents will consequently combine additively and, since the magnitude of the current from aperture 651 is twice the magnitude of either the current from aperture 605 or aperture 606, the magnitude of the combined current is four times that of either the current from aperture 605 or aperture 606. This current is delivered by the flexible coaxial line 614 to the measuring device 616 which then operates its indicator 617 in accordance with this combined current. The scale 620 of the measuring device 616 can be calibrated in a manner similar to that described above to read in terms of the value of the power flowing from left to right in the wave guide 602.

If there is a mismatch between the impedance of the load circuit 603 and the impedance of the wave guide 602, then reflected wave energy will flow from right to left along the wave guide 602. Portions of this wave energy will pass through the apertures 605, 651, and 606 into the wave guide 604 and will be picked up by the probes 652 and 653.

For reasons similar to those explained above in the case of the direct wave, the currents picked up by the probe 653, due to the above-mentioned portions of the reflected wave energy passing into wave guide 604, will cancel and will produce no effect at this time on the indicator 617 of the measuring device 616. However, the currents picked up by the probe 652, due to the presence of these portions of the reflected wave energy in wave guide 604, will combine additively for reasons similar to those explained above in the case of the direct wave and will be delivered by the flexible coaxial line 613 to the measuring device 615 which then operates its indicator 618 in accordance with this combined current. The scale 621 of the measuring device 615 can be calibrated in a manner similar to that described above to read in terms of the value of the power flowing from right to left in the wave guide 602.

The values thus indicated on the scales 620 and 621 can be employed for purposes similar to those explained above. An important advantage of the device shown in Fig. 6 is that, since it is provided with a third aperture 651 having the characteristics described above, the device can be usefully employed with wave energy having a wide range of frequencies. In other words, the frequency of the waves produced by generator 1 can be varied over a wide band and still produce a useful result.

In Fig. 7, a wave generator 701 has its output energy conveyed by a wave guide 702 to a load circuit 703. The frequency of the wave energy of generator 701 can be varied by adjusting the manually operated tuning dial 750. Mounted upon the wave guide 702 is a second wave guide 704. It is to be noted that, whereas in Fig. 6 the wave guide 604 abutted against a narrow side of the wave guide 602, in Fig. 7 the wave guide 704 is so disposed that one of its wide sides is contiguous with one of the wide sides of the wave guide 702. Wave guide 704 is loosely coupled electrically to wave guide 702 by means of three transverse narrow slots 705, 751, and 706 cut in the contiguous metallic envelopes of wave guides 702 and 704 as is indicated in Fig. 7. Two measuring devices 715 and 716 having indicators 718 and 717 are coupled to the ends of the wave guide 704 as shown in Fig. 7.

The slots 705, 751, and 706 are so disposed that the distance from the center line of slot 705 to the center line of slot 751 is substantially equal to one-quarter wavelength of the wave energy produced by generator 701 and the distance from the center line of slot 751 to the center line of slot 706 is also substantially equal to the same one-quarter wavelength. Slots 705 and 706 are of equal size and the width of each is relatively small as compared with the wavelength of the wave energy produced by the generator 701. Each slot 705 and 706 should preferably not be wider than one-tenth of this wavelength. The width of the middle slot 751 is sufficiently greater than the width of either slot 705 or 706 so that it will admit wave energy having approximately four times as much power and twice the electric field strength as the wave energy admitted by either slot 705 or 706.

The operation and function of the device of Fig. 7 are similar to those explained above in connection with the description of the operation and function of the device of Fig. 6.

It is to be understood that the coupling apertures of the various directive pick-up devices described above are not restricted to the particular shapes illustrated in the drawings as they can be of any suitable shape. Furthermore, in certain of the directive pick-up devices, the coupling can be effected by employing either coupling apertures, coupling metallic probes, or coupling loops as desired.

Figure 8:
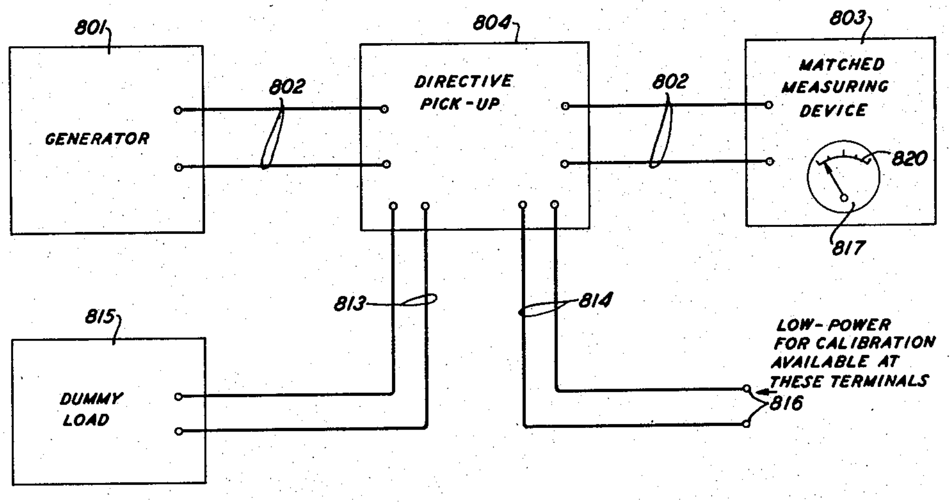
Fig. 8 is a block diagram illustrating the manner in which the directive pick-up can be employed for obtaining small amounts of power for calibration purposes.

In Fig. 8, a wave generator 801 has its output conveyed by a transmission line 802 to a matched measuring device 803 having an indicator 817 and a calibrated indicating scale 820. A directive pick-up device 804, which can be of any of the forms explained above in connection with the description of Figs. 1 to 7, inclusive, is coupled to the transmission line 802. Coupled to the directive pick-up device 804 in a manner similar to that described above are two transmission lines 813 and 814. Line 813 terminates in a dummy load 815 adapted to absorb all the energy supplied thereto by line 813. Line 814 terminates in a pair of output terminals 816.

Low power suitable for calibration purposes will be derived by the directive pick-up device 804 from the direct wave energy, flowing in the transmission line 802, in the manner described above and will be delivered over line 814 to the output terminals 816. In general, the value of this low power will be less than one one-hundredth of the value of the power delivered by generator 801 to the line 802. The value of this low power can be ascertained by properly calibrating the scale 820 of the matched measuring device 803 in a manner similar to that described above.

Figure 9:
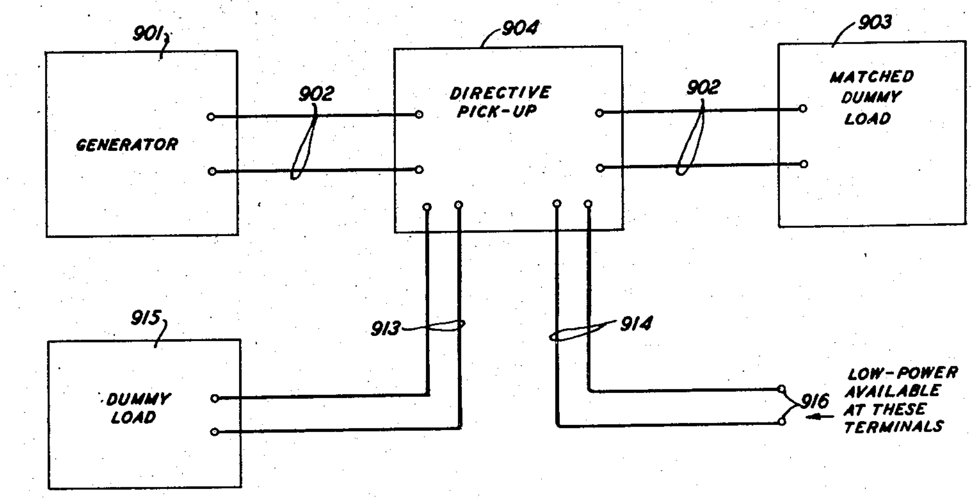
Fig. 9 is a block diagram illustrating the manner in which the directive pick-up can be employed as an attenuator.

In Fig. 9, a wave generator 901 has its output conveyed by a transmission line 902 to a matched dummy load 903. A directive pick-up device 904, similar to any of those described above, is coupled to the transmission line 902. Coupled to the directive pick-up device 904 in a manner similar to that described above are two transmission lines 913 and 914. Line 913 terminates in a dummy load 915 adapted to absorb all the energy supplied thereto by line 913. Line 914 terminates in a pair of output terminals 916.

The device shown in Fig. 9 constitutes a reliable fixed attenuation pad which can be employed for various purposes, such as measuring attenuation of lines by the substitution method.

Although the invention has been illustrated as employing only a few coupling means in each directive pick-up device, the invention is not limited to only a small number of coupling means as any desired number of coupling means can be employed for any one directive pick-up device whether wave guide, coaxial line, or two-wire line. For example, in the case of the directive pick-up device shown in Fig. 6, a multiplicity of coupling means can be employed for coupling the transmission line 604 to the transmission line 602. The advantage of using a multiplicity of coupling means is that, when the number of coupling means is increased, there will be a corresponding increase in the range of useful frequencies of the wave energy produced by the wave generator; that is, the frequency of the wave generator can be varied over a wider useful range.

In the event that it is desired to use a relatively large number of coupling means for the above purpose, this can be accomplished by so spacing the coupling apertures that the distance from the center of one aperture to the center of the next adjacent aperture will be substantially equal to one-quarter wavelength of the wave energy produced by the wave generator. These multiple coupling apertures should have various sizes in accordance with their locations; that is, the end apertures should have the smallest size, the middle aperture or apertures should be the largest, and the intermediate apertures should have correspondingly intermediate sizes so that the portions of wave energy passing through them will induce in the auxiliary line individual currents having different magnitudes in accordance with the coefficients obtained from the binomial theorem. For example, if N is the number of coupling apertures employed in a given directive pick-up device and M represents the magnitude of each individual induced current, then the following table can be used:

| N | M |
|---|---|
| 2 | 1 1 |
| 3 | 1 2 1 |
| 4 | 1 3 3 1 |
| 5 | 1 4 6 4 1 |
| 6 | 1 5 10 10 5 1 |

Figure 10:
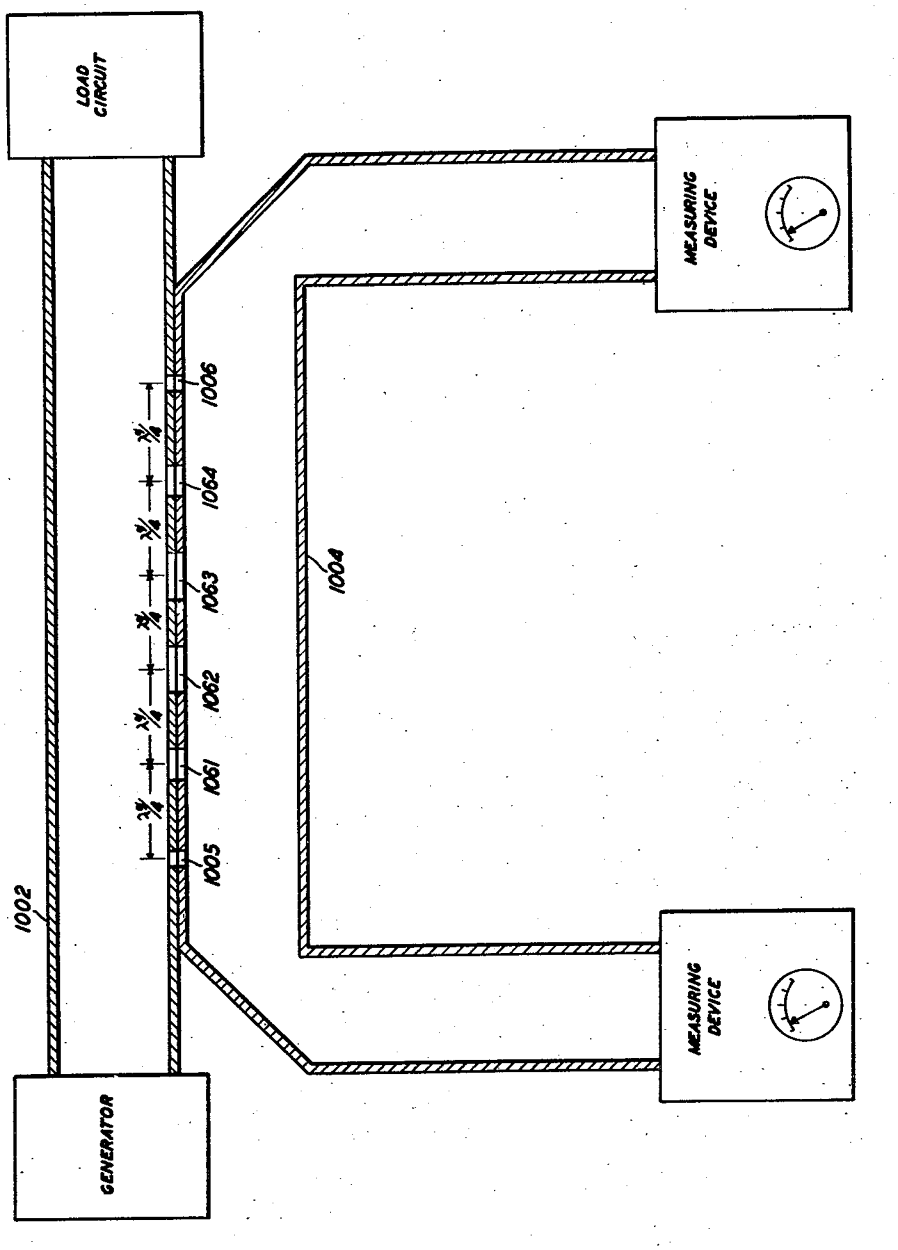
Fig. 10 is a schematic view of a modification of the directive pick-up device employing a multiplicity of coupling means.

The use of such a multiplicity of coupling means is shown in Fig. 10 in which the main transmission line 1002 is coupled to an auxiliary transmission line 1004 by a multiplicity of coupling apertures 1005, 1006, 1061, 1062, 1063, and 1064. In accordance with the explanation given above, the two end apertures 1005 and 1006 are of equal size and are the smallest of this group of six coupling apertures, the two middle apertures 1062 and 1063 are of equal size and are the largest of the six coupling apertures, and the two intermediate apertures 1061 and 1064 are of equal size and their size is intermediate that of the small apertures 1005 and 1006 and the large apertures 1062 and 1063.

What is claimed is:

1. In a signaling system, a first transmission system, a second transmission system, and a succession of couplers coupling said transmission systems, the magnitude of the coupling afforded by the successive couplers being as the successive coefficients of the expansion of $(a+b)^n$ where $n$ is one less than the number of couplers.

2. In a wave transmission system, a pair of wave guides contiguous over a portion of their respective lengths, the common wall separating the two wave guides at their contiguous portions having a plurality of apertures providing a succession of wave coupling means, the magnitudes of the couplings afforded by the successive couplers being as the successive coefficients of the expansion of $(a+b)^n$ where $n$ is one less than the number of couplers.

3. In a signaling system, a first transmission system, a second transmission system; a plurality of couplers for coupling said transmission systems, said couplers being spaced apart an odd number of effective quarter wavelengths of a signal frequency in said first transmission system, the amount of coupling at successive couplers being related to the successive coefficients of the binomial expansion of $(a+b)^n$ where $n$ is one less than the number of said coupling elements.

4. In a wave transmission system, a pair of wave guides contiguous over a portion of their respective lengths, the common wall separating the two wave guides at their contiguous portions having a plurality of transverse slots therein to provide a succession of wave coupling means, the magnitudes of the couplings afforded by the successive slots being as the successive coefficients of the expansion of $(a+b)^n$ where $n$ is one less than the number of slots.

5. In a signaling system, a first transmission system, a second transmission system, each of said systems causing a phase shift of signals passing therethrough, and a succession of couplers coupling said transmission systems, the magnitude of the coupling afforded by the successive couplers being as the successive coefficients of the expansion of $(a+b)^n$ where $n$ is one less than the number of couplers, the phase shift introduced and the magnitude of coupling being such that wave energy induced in one direction in the second transmission system from wave energy in a corresponding direction in the first transmission system is in phase at the succession of couplers and wave energy induced in the opposite direction from the same wave energy in the first transmission system is 180 degrees out of phase at the succession of couplers.

6. High-frequency apparatus responsive to power flow in only a predetermined direction along a high-frequency energy-conductor adapted to have a source coupled to one end and a load coupled to the other end, comprising a second high-frequency energy-conductor coupled to said first conductor at a pair of points spaced longitudinally along said first conductor, said points being separated substantially a quarter wavelength at the operating frequency, means for terminating one end of said second conductor in substantially reflectionless manner, the other end of said second conductor being adapted to be coupled to an output circuit, each of said conductors comprising a tubular conductive enclosing boundary, and said coupling between said conductors being provided by aligned openings in the boundaries of said two conductors at each of said points.

7. In combination, a source of electric wave energy, a load circuit, a main shielded line for guiding said wave energy to the load circuit, said load circuit tending to reflect a portion of said wave energy back over said main line, and a short section of auxiliary shielded line placed contiguously along the side of said main line and electrically coupled thereto by only a plurality of coupling apertures in the shield of each of said lines, the coupling apertures in one line being contiguous with the coupling apertures in the other of said lines for guiding fractional portions of both the direct and reflected wave energy from the main line into said auxiliary line, said auxiliary line being terminated at each end in its characteristic impedance and the center of each coupling aperture in each line being spaced apart from the center of an adjacent coupling aperture in the same line by a distance substantially equal to one-quarter of the wavelength of the electric wave energy from said source whereby electric wave energy that is a function of only the direct wave energy in the main line appears at only one end of the auxiliary line while other electric wave energy that is a function of only the reflected wave energy in the main line appears simultaneously at only the other end of the auxiliary line.

8. The combination according to claim 7 wherein said shielded lines are each rectangular wave guides and wherein said coupling apertures are transverse slots disposed in the face of said wave guides, which face is perpendicular to the lines of electric force of said wave energy.

9. In combination, a source of electric wave energy, a load circuit, a main shielded line for guiding said wave energy to the load circuit, said load circuit tending to reflect a portion of said wave energy back over said main line, and a short section of auxiliary shielded line placed contiguously along the side of said main line and terminated at each end in its characteristic impedance, each of said shielded lines having two coupling apertures in their shield, all of said apertures being of equal size and the apertures in one line being contiguous with the apertures in the other line for electrically coupling said lines whereby fractional portions of both the direct and reflected wave energy in the main line are guided into the auxiliary line, each pair of coupling apertures in each line having their centers spaced apart by a distance substantially equal to one-quarter of the wavelength of the wave energy from said source whereby electric wave energy proportional to only the direct wave energy in the main line appears at only one end of the auxiliary line while other electric wave energy proportional to only the reflected wave energy in the main line appears simultaneously at only the other end of the auxiliary line.

10. In combination, a source of electric wave energy, a load circuit, a main shielded line for guiding said wave energy to the load circuit, said load circuit tending to reflect a portion of said wave energy back over said main line, and a short section of auxiliary shielded line placed contiguously along the side of said main line and terminated at each end in its characteristic impedance, each of said shielded lines having three coupling apertures in their shield, the apertures in one line being contiguous with the apertures in the other line for electrically coupling said lines whereby fractional portions of both the direct and reflected wave energy in the main line are guided into the auxiliary line, two of the coupling apertures in each line being all of equal size and having their centers spaced apart by a distance substantially equal to one-half of the wavelength of the wave energy from said source, the third coupling aperture in each line being both of the same size and sufficiently larger than the other coupling apertures for guiding four times as much wave energy into the auxiliary line as is admitted by either of the other pairs of contiguous apertures, said third coupling aperture in each line having its center spaced apart from the center of each of the other two coupling apertures in the same line by a distance substantially equal to one-quarter of the wavelength of the wave energy from said source whereby electric wave energy proportional to only the direct wave energy in the main line appears at only one end of the auxiliary line while other electric wave energy proportional to only the reflected wave energy in the main line appears simultaneously at only the other end of the auxiliary line.

11. In combination, a source of electric wave energy, a load circuit, a main shielded line for guiding said wave energy to the load circuit, said load circuit tending to reflect a portion of said wave energy back over said main line, and a short section of auxiliary shielded line placed contiguously along the side of the main line and terminated at each end in its characteristic impedance, each of said shielded lines having a multiplicity of coupling apertures in their shield, the apertures in one line being contiguous with the apertures in the other line for electrically coupling said lines whereby fractional portions of both the direct and reflected wave energy in the main line are guided into the auxiliary line, the sizes of the coupling apertures in each line progressively increasing from the end apertures toward the middle apertures for admitting into the auxiliary line different portions of both direct and reflected wave energy having different magnitudes for inducing in the auxiliary line individual currents having their successive magnitudes related to the successive coefficients of the binomial expansion of $(a+b)^n$ where $n$ is one less than the number of said coupling apertures in said auxiliary line, the center of each coupling aperture in each line being spaced apart from the center of an adjacent coupling aperture in the same line by a distance substantially equal to one-quarter of the wavelength of the wave energy from said source whereby electric wave energy proportional to only the direct wave energy in the main line appears at only one end of the auxiliary line while other electric wave energy proportional to only the reflected wave energy in the main line appears simultaneously at only the other end of the auxiliary line.

12. A system for measuring the value of electric power absorbed by a load circuit, said system comprising in combination a source of electric wave energy, a load circuit, a main shielded transmission line for transmitting said wave energy to the load circuit, said load circuit tending to reflect a portion of said wave energy back over said line, an auxiliary shielded transmission line placed contiguously along the side of said main line and electrically coupled thereto by only two coupling apertures in the shield of each of said lines, said coupling apertures being all of equal size and the apertures in one line being contiguous with those in the other line for guiding fractional portions of both the direct and reflected wave energy from the main line into the auxiliary line, the apertures in each line being spaced apart by a distance substantially equal to one-quarter of the wavelength of the wave energy from said source whereby electric wave energy proportional to only the direct wave energy in said main line appears at only one end of the auxiliary line while other electric wave energy that is proportional to only the reflected wave energy in the auxiliary line appears simultaneously at only the other end of the auxiliary line, a first square law detecting device located within the shield of said auxiliary line near one end thereof for absorbing electric wave energy from that end of the auxiliary line and for producing a direct current the strength of which is proportional to the value of the power in the direct wave energy in the main line, a second square law detecting device located within the shield of said auxiliary line near the other end thereof for absorbing electric wave energy from the end of the auxiliary line and for producing a direct current the strength of which is proportional to the value of the power in the reflected wave energy in the main line, a direct current meter, and means for supplying the direct currents produced by said first and second detecting devices to said meter in series opposition for operating said meter in accordance with the value of the difference between these two direct currents to produce a single meter indication that is a direct measure of the instantaneous value of the electric power absorbed by said load circuit.

WILLIAM W. MUMFORD.

REFERENCES CITED

The following references are of record in the file of this patent:

UNITED STATES PATENTS

| Number | Name | Date |
|---|---|---|
| 2,111,595 | Leng | Mar. 22, 1938 |
| 2,191,271 | Carter | Feb. 20, 1940 |
| 2,205,873 | Buschbeck | June 25, 1940 |
| 2,284,379 | Dow | May 26, 1942 |
| 2,375,223 | Hansen | May 8, 1945 |
| 2,423,390 | Korman | July 1, 1947 |

FOREIGN PATENTS

| Number | Country | Date |
|---|---|---|
| 545,936 | Great Britain | June 18, 1942 |

OTHER REFERENCES

Publication, "An Instrument for Direct Measurement of the Travelling Wave Coefficient in Feeders," by Pistelkors & Neuman; "Elektrosvyas," vol. IX, No. 4, April 1941, pages 9–15, copy in Library of Congress. This Russian article has been translated as R. T. P. Translation No. 1525 by the Ministry of Aircraft Production of Great Britain. Copy in Div. 69, Class 171, subclass 95, unofficial subclass 23.

Publication in Wireless Engineer, vol. 20, 1943, pages 364–367, called "An Instrument for Direct Measurement of the Travelling Wave Coefficient in Feeders."